(12) United States Patent
Lath

(10) Patent No.: US 10,183,463 B2
(45) Date of Patent: Jan. 22, 2019

(54) DECORATIVE PANEL

(71) Applicant: Sensitile Systems, Ypsilanti, MI (US)

(72) Inventor: Abhinand Lath, Ann Arbor, MI (US)

(73) Assignee: SENSITILE SYSTEMS, Ypsilanti, MI (US)

( * ) Notice: Subject to any disclaimer, the term of this patent is extended or adjusted under 35 U.S.C. 154(b) by 398 days.

(21) Appl. No.: 14/849,138

(22) Filed: Sep. 9, 2015

(65) Prior Publication Data

US 2016/0326748 A1 Nov. 10, 2016

Related U.S. Application Data

(60) Provisional application No. 62/156,473, filed on May 4, 2015.

(51) Int. Cl.
*B32B 3/30* (2006.01)
*B44F 1/04* (2006.01)
(Continued)

(52) U.S. Cl.
CPC ............ *B32B 3/30* (2013.01); *B32B 7/02* (2013.01); *B32B 7/12* (2013.01); *B32B 17/06* (2013.01); *B32B 17/10* (2013.01); *B32B 17/10247* (2013.01); *B32B 27/08* (2013.01); *B32B 27/308* (2013.01); *B44C 3/02* (2013.01); *B44F 1/04* (2013.01); *B44F 1/06* (2013.01); *B32B 3/266* (2013.01); *B32B 9/045* (2013.01); *B32B 17/00* (2013.01); *B32B 17/064* (2013.01); *B32B 17/10009* (2013.01); *B32B 17/1044* (2013.01); *B32B 17/10045* (2013.01); *B32B 17/10146* (2013.01); *B32B 17/10183* (2013.01); *B32B 17/10339* (2013.01); *B32B 2250/05* (2013.01); *B32B 2250/24* (2013.01); (Continued)

(58) Field of Classification Search
None
See application file for complete search history.

(56) References Cited

U.S. PATENT DOCUMENTS

D40,794 S * 7/1910 Magon ..................... D25/105
1,463,836 A * 8/1923 Pfister ....................... 156/276
(Continued)

FOREIGN PATENT DOCUMENTS

CH 378736 A * 6/1964 ............. C09F 13/00
CH 556249 A * 11/1974 ............. B44F 1/066
(Continued)

OTHER PUBLICATIONS

Machine Translation of JP 2007138424 A, Jun. 2007.*
(Continued)

*Primary Examiner* — Jeffrey A Vonch
(74) *Attorney, Agent, or Firm* — Brinks Gilson & Lione

(57) ABSTRACT

A decorative panel has a first layer, a second layer, and a third layer. The first layer may be transparent, the second layer is fully or partially reflective, and the third layer is partially reflective or transparent. A cavity having an opening in the shape of a design is formed within a portion of the second layer. The opening is configured to allow light to enter the decorative panel through the second layer. The light entering the decorative panel will be outputted by the third layer in a shape substantially similar to the design.

11 Claims, 5 Drawing Sheets

(51) Int. Cl.
*B44F 1/06* (2006.01)
*B32B 17/10* (2006.01)
*B32B 27/08* (2006.01)
*B32B 27/30* (2006.01)
*G02B 5/00* (2006.01)
*E04F 13/077* (2006.01)
*E04F 13/15* (2006.01)
*E04F 13/18* (2006.01)
*B32B 7/02* (2006.01)
*B32B 7/12* (2006.01)
*B32B 17/06* (2006.01)
*B44C 3/02* (2006.01)
*B32B 3/24* (2006.01)
*E04F 13/08* (2006.01)
*B32B 3/26* (2006.01)
*E04F 13/14* (2006.01)
*F21V 8/00* (2006.01)
*B44C 5/04* (2006.01)
*B44C 3/00* (2006.01)
*B32B 9/04* (2006.01)
*B32B 17/00* (2006.01)

(52) U.S. Cl.
CPC ....... *B32B 2250/40* (2013.01); *B32B 2255/00* (2013.01); *B32B 2255/10* (2013.01); *B32B 2307/412* (2013.01); *B32B 2307/416* (2013.01); *B32B 2315/08* (2013.01); *B32B 2333/12* (2013.01); *B32B 2419/00* (2013.01); *B32B 2451/00* (2013.01); *B32B 2607/00* (2013.01); *B44C 3/005* (2013.01); *B44C 5/04* (2013.01); *B44C 5/0407* (2013.01); *B44C 5/0446* (2013.01); *B44C 5/0461* (2013.01); *B44F 1/045* (2013.01); *B44F 1/066* (2013.01); *E04F 13/077* (2013.01); *E04F 13/0866* (2013.01); *E04F 13/0871* (2013.01); *E04F 13/145* (2013.01); *E04F 13/18* (2013.01); *G02B 6/005* (2013.01); *G02B 6/006* (2013.01); *G02B 6/0013* (2013.01); *G02B 6/0016* (2013.01); *G02B 6/0055* (2013.01); *G02B 6/0076* (2013.01); *Y10T 428/24331* (2015.01); *Y10T 428/24612* (2015.01); *Y10T 428/24942* (2015.01)

(56) References Cited

U.S. PATENT DOCUMENTS

| | | | | |
|---|---|---|---|---|
| 1,525,107 A * | 2/1925 | Spencer | C25D 5/02 | 116/DIG. 36 |
| 1,568,954 A * | 1/1926 | Boedtcher | G09F 13/06 | 40/615 |
| 1,592,398 A * | 7/1926 | Van Bloem | G09F 13/06 | 40/616 |
| 1,593,314 A * | 7/1926 | Stevens | B44F 9/06 | 156/277 |
| 1,707,965 A * | 4/1929 | Scantlebury | G02B 6/0091 | 340/815.56 |
| 1,973,792 A * | 9/1934 | Barrows | B32B 17/10018 | 362/351 |
| 2,058,058 A * | 10/1936 | Caccia | G09F 13/26 | 165/178 |
| 2,065,406 A * | 12/1936 | Silverman | C03C 17/38 | 156/153 |
| 2,069,368 A * | 2/1937 | Horinstein | G09F 13/12 | 359/599 |
| 2,095,402 A * | 10/1937 | Stark, Jr. | B44F 1/06 | 156/244.11 |
| 2,105,265 A * | 1/1938 | Reilly | B44C 5/04 | 156/222 |
| D109,025 S * | 3/1938 | Perkins | 52/306 | |
| 2,114,711 A * | 4/1938 | Horinstein | G09F 13/12 | 40/219 |
| 2,251,144 A * | 7/1941 | Lytle | C03C 17/02 | 283/94 |
| 2,566,026 A * | 8/1951 | Hughes, Jr. | G01D 11/28 | 116/287 |
| 2,807,111 A | 9/1957 | Turner | | |
| 3,226,865 A * | 1/1966 | Brand | G09F 13/06 | 40/615 |
| 3,255,665 A * | 6/1966 | Weiher | F21S 11/00 | 359/595 |
| 3,338,730 A | 8/1967 | Slade et al. | | |
| 3,406,475 A * | 10/1968 | O'Donnell | G02B 6/0021 | 362/23.15 |
| 3,553,869 A * | 1/1971 | Dickinson | G09F 13/06 | 40/559 |
| 3,666,605 A * | 5/1972 | Meyer | E04C 2/54 | 428/38 |
| 3,876,293 A | 4/1975 | Ramos | | |
| 4,043,636 A | 8/1977 | Eberhardt et al. | | |
| 4,364,596 A * | 12/1982 | Geisendorfer | B60J 1/2005 | 296/91 |
| 4,440,814 A | 4/1984 | Wolters | | |
| 4,540,241 A * | 9/1985 | Rivier | F21S 11/00 | 359/593 |
| 4,546,019 A * | 10/1985 | Schneider | B44F 7/00 | 40/582 |
| D286,173 S * | 10/1986 | Baus | D23/305 | |
| 4,663,869 A * | 5/1987 | Nakagawa | G09F 13/12 | 40/219 |
| 4,975,307 A * | 12/1990 | Sollogoub | B32B 17/10 | 428/34 |
| 4,995,185 A * | 2/1991 | Cheng | G09F 13/16 | 359/629 |
| 4,997,687 A * | 3/1991 | Carter | B44F 1/08 | 427/272 |
| 5,271,973 A * | 12/1993 | Huether | B44F 1/06 | 428/13 |
| 5,461,496 A * | 10/1995 | Kanada | E06B 9/24 | 359/592 |
| 5,536,558 A * | 7/1996 | Shelton | G09F 13/20 | 156/209 |
| 5,682,255 A * | 10/1997 | Friesem | G02B 5/188 | 359/15 |
| 5,830,529 A * | 11/1998 | Ross | B41M 3/12 | 427/152 |
| 5,992,068 A * | 11/1999 | de Saro | G09F 13/08 | 40/564 |
| 6,042,912 A * | 3/2000 | Simoni | B32B 17/10247 | 160/236 |
| D423,689 S * | 4/2000 | Lamberts | D25/106 | |
| D425,212 S * | 5/2000 | Lamberts | D25/109 | |
| 6,205,691 B1* | 3/2001 | Urda | G09F 13/02 | 40/559 |
| 6,208,466 B1* | 3/2001 | Liu | G02B 5/021 | 359/584 |
| 6,212,805 B1* | 4/2001 | Hill | B44F 1/066 | 40/442 |
| 6,240,664 B1* | 6/2001 | Hjaltason | G02B 6/0003 | 362/812 |
| 6,308,444 B1* | 10/2001 | Ki | G09F 13/18 | 362/293 |
| 6,358,598 B1* | 3/2002 | Hicks | G09F 7/12 | 428/195.1 |
| 6,514,621 B1* | 2/2003 | Marietti | B32B 17/10174 | 428/432 |
| 6,526,681 B1* | 3/2003 | De Saro | G09F 13/04 | 40/564 |
| D478,674 S * | 8/2003 | Lamberts | D25/110 | |
| 6,612,055 B2* | 9/2003 | Bradford | G02B 6/0038 | 40/541 |
| 6,639,203 B1* | 10/2003 | Kerschner | G02B 17/0808 | 250/208.1 |
| 6,728,034 B1* | 4/2004 | Nakanishi | G02B 5/1809 | 359/566 |

(56) References Cited

U.S. PATENT DOCUMENTS

| | | | |
|---|---|---|---|
| D498,856 S * | 11/2004 | Froech | D25/157 |
| 7,195,389 B2 | 3/2007 | Parker et al. | |
| 7,354,184 B2 | 4/2008 | Parker | |
| 2003/0031842 A1* | 2/2003 | Marietti | B32B 17/10174 428/195.1 |
| 2003/0091758 A1* | 5/2003 | Osumi | B32B 17/06 428/34 |
| 2003/0122393 A1* | 7/2003 | Birt | B60J 7/003 296/211 |
| 2003/0123246 A1 | 7/2003 | Parker | |
| 2003/0194540 A1* | 10/2003 | Fusco | B32B 27/04 428/195.1 |
| 2004/0213974 A1* | 10/2004 | Hicks | B32B 7/02 428/216 |
| 2005/0153106 A1* | 7/2005 | Lansberry | B32B 17/10 428/195.1 |
| 2006/0181769 A1* | 8/2006 | Kumasawa | G03B 21/604 359/449 |
| 2006/0291200 A1* | 12/2006 | Milburn | B32B 3/12 362/227 |
| 2007/0234608 A1* | 10/2007 | Morrison | G09F 13/00 40/546 |
| 2008/0250563 A1* | 10/2008 | Arnthorsson | G09F 13/04 5/615 |
| 2009/0073721 A1* | 3/2009 | Kamikatano | F21V 7/05 362/616 |
| 2009/0199888 A1* | 8/2009 | Kuhn | H02S 20/00 136/244 |
| 2011/0195224 A1* | 8/2011 | Zhang | B29C 45/14221 428/138 |
| 2011/0247158 A1* | 10/2011 | Jungnickel | G09F 13/06 15/167.1 |
| 2012/0087145 A1* | 4/2012 | Hudson | F21V 11/00 362/601 |
| 2012/0088054 A1* | 4/2012 | Chacko | B32B 27/00 428/41.8 |
| 2012/0196085 A1* | 8/2012 | Langan | B41M 5/0358 428/141 |
| 2012/0230053 A1* | 9/2012 | Griffiths | G02B 6/0036 362/605 |
| 2012/0250353 A1* | 10/2012 | Sakamoto | G02B 6/0036 362/612 |
| 2013/0078435 A1* | 3/2013 | Massetti | B32B 7/02 428/195.1 |
| 2014/0111862 A1* | 4/2014 | Yamamoto | G02F 1/133504 359/599 |
| 2015/0024165 A1* | 1/2015 | Gilde | F41H 5/0407 428/134 |
| 2015/0125668 A1* | 5/2015 | Matsumoto | B44F 1/02 428/195.1 |
| 2015/0212384 A1* | 7/2015 | Kitson | G02B 27/144 359/263 |

FOREIGN PATENT DOCUMENTS

| | | | | |
|---|---|---|---|---|
| CH | 686566 A5 * | 4/1996 | | B32B 15/08 |
| CN | 201284979 Y * | 8/2009 | | |
| DE | 3029614 A1 * | 3/1982 | | B44C 3/12 |
| DE | 3542243 A1 * | 6/1987 | | G02B 6/006 |
| DE | 4112097 A1 * | 10/1992 | | A47B 96/206 |
| DE | 4339274 A1 * | 5/1995 | | G02B 6/005 |
| DE | 4404425 A1 * | 8/1995 | | F21S 6/002 |
| DE | 4415457 A1 * | 11/1995 | | G09F 13/12 |
| DE | 4435958 A1 * | 4/1996 | | E04C 2/543 |
| DE | 29609211 U1 * | 9/1996 | | B24B 19/03 |
| DE | 19813711 A1 * | 9/1999 | | B24B 19/03 |
| DE | 29909742 U1 * | 9/1999 | | A47G 33/00 |
| DE | 10347424 A1 * | 5/2005 | | B32B 17/06 |
| DE | 202008008101 U1 * | 9/2008 | | G09F 13/08 |
| EP | 6231 A * | 1/1980 | | |
| EP | 0169509 A2 * | 1/1986 | | B32B 17/10045 |
| EP | 0856615 A2 * | 8/1998 | | B32B 17/10027 |
| FR | 2223973 A * | 11/1974 | | |
| FR | 2414482 A * | 3/1979 | | |
| FR | 2650976 A1 * | 2/1991 | | B44F 1/10 |
| FR | 2727059 A1 * | 5/1996 | | B41M 3/18 |
| FR | 2775969 A1 * | 9/1999 | | B32B 17/10247 |
| FR | 2943949 A1 * | 10/2010 | | B44F 1/045 |
| GB | 835101 A * | 5/1960 | | C03C 23/00 |
| GB | 1390462 A * | 4/1975 | | B44C 3/12 |
| GB | 2209964 A * | 6/1989 | | B44C 3/005 |
| JP | 58120313 U * | 8/1983 | | |
| JP | 01142595 A * | 6/1989 | | |
| JP | 01252558 A * | 10/1989 | | B32B 17/10247 |
| JP | 02239932 A * | 9/1990 | | |
| JP | 02273300 A * | 11/1990 | | |
| JP | 03065528 A * | 3/1991 | | |
| JP | 03287995 A * | 12/1991 | | |
| JP | 03296001 A * | 12/1991 | | |
| JP | 09021207 A * | 1/1997 | | |
| JP | 09175838 A * | 7/1997 | | |
| JP | 10049085 A * | 2/1998 | | |
| JP | 11042728 A * | 2/1999 | | |
| JP | 11048700 A * | 2/1999 | | |
| JP | 2001154616 A * | 6/2001 | | |
| JP | 2001312233 A * | 11/2001 | | |
| JP | 2002328633 A * | 11/2002 | | |
| JP | 2003202824 A * | 7/2003 | | |
| JP | 2007138424 A * | 6/2007 | | |
| JP | 2007241234 A * | 9/2007 | | |
| JP | 2010029408 A * | 2/2010 | | |
| JP | 2010120162 A * | 6/2010 | | |
| KR | 20010083510 A * | 9/2001 | | |
| TW | 201418008 A * | 5/2014 | | |

OTHER PUBLICATIONS

Machine Translation of JP 2007241234 A,Sep. 2007.*
Machine Translation of EP 6231 A, Jan. 1980.*
Sensitile Systems, Vapor, 2012 (no month).*
Lau, Product: Sensitile Systems Vapor, Sep. 2012.*
Machine Translation of JP 2003202824 A, Jul. 2003 (Year: 2003).*
Abstract for HU 28170 T, Nov. 1983 (Year: 1983).*

* cited by examiner

DECORATIVE PANEL

CROSS REFERENCE TO RELATED APPLICATIONS

This application claims priority to U.S. Provisional Patent Application 62/156,473 filed on May 4, 2015, which is hereby incorporated by reference in its entirety.

BACKGROUND

1. Field of the Invention

The invention relates to decorative panels, especially decorative panels utilized for buildings.

2. Summary of the Known Art

The invention relates to decorative panels, especially decorative panels utilized for buildings.

Light emitting transparent panels of various kinds are known in the art. These panels are illuminated at one or more places along an edge of the panel using any one of a number of different light sources, such as light emitting diodes. The light from the light sources in a transparent panel with flat, parallel surfaces will have a shallow enough angle to continuously reflect from the surfaces of the panel and be confined within the panel. The light hat does not have a sufficiently shallow angle will be emitted from the light panel very near the light source, and can be shaded to blackened out there. However, given a pattern of light extracting deformities or disruptions in the surface of the panel, some of the light within and passing along the panel will be interrupted and redirected outward from the surface of the panel and made visible to one looking at that surface of the panel. The light extracting deformities in the prior art have been formed by etching or molding. The size, shape and other characteristics of these deformities or disruptions may take various forms and have, in the prior art, been made of uniform size, or of increasing size with increasing distance from the light source.

SUMMARY

The present disclosure provides a decorative panel that has a first layer, a second layer, and a third layer. The first layer may be transparent, the second layer may be fully or partially reflective, and the third layer is partially reflective or transparent. A cavity having an opening in the shape of a design is formed within a portion of the second layer. The opening is configured to allow light to enter the decorative panel through the second layer. The light entering the decorative panel will be outputted by the third layer in a shape substantially similar to the design.

In another form, the decorative panel may include a sacrificial layer adjacent to the second layer. The sacrificial layer has a sacrificial layer opening. The shape of the sacrificial layer opening being substantially similar to a shape defined by the opening of the second layer.

Further objects, features and advantages of this invention will become readily apparent to persons skilled in the art after a review of the following description, with reference to the drawings and claims that are appended to and form a part of this specification.

DETAILED DESCRIPTION

Figure 1A:
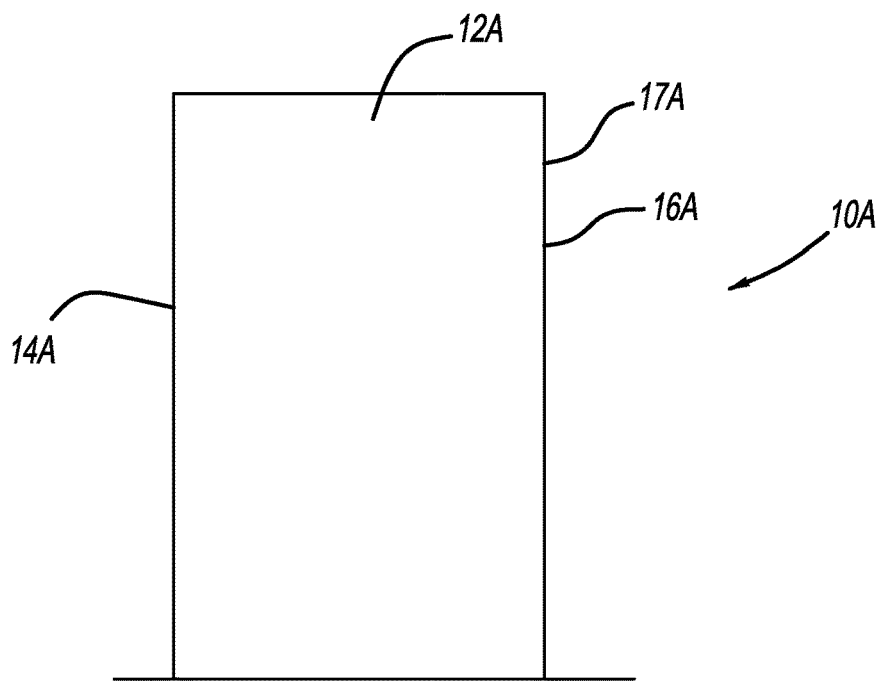
FIGS. 1A and 1B illustrate one example of a decorative showing a one way transfer of light without the use of the sacrificial layer.

The following description is merely exemplary in nature and is in no way intended to limit the present disclosure or its application or uses. It should be understood that throughout the description, corresponding reference numerals indicate like or corresponding parts and features.

Referring now to FIG. 1A, a light panel 10A is shown. The light panel 10A is shown to be rectangular, but may take any one of a number of different shapes. Here, the light panel 10A includes a first layer 12A. The first layer 12A is substantially transparent and may be made of any one of a number of different materials such as PMMA acrylic, glass, or any other transparent material. Adjacent to one side of the first layer 12A is a second layer 16A. The second layer 16A may be fully or partially reflective and is adjacent to one side of the first layer. In one example, the second layer 16A is made of PMMA acrylic, glass, or any other transparent material but is also plated with a fully or partially reflective coating 17A.

Opposite of the second layer 16A, is a third layer 14A. The third layer of 14A may be a partially reflective or transparent. Materials utilized to make the third layer 14A may include PMMA acrylic, glass, or any other transparent material. If the third layer 14A is partially reflective, the third layer may also be plated with a partially reflective coating.

Figure 1B:
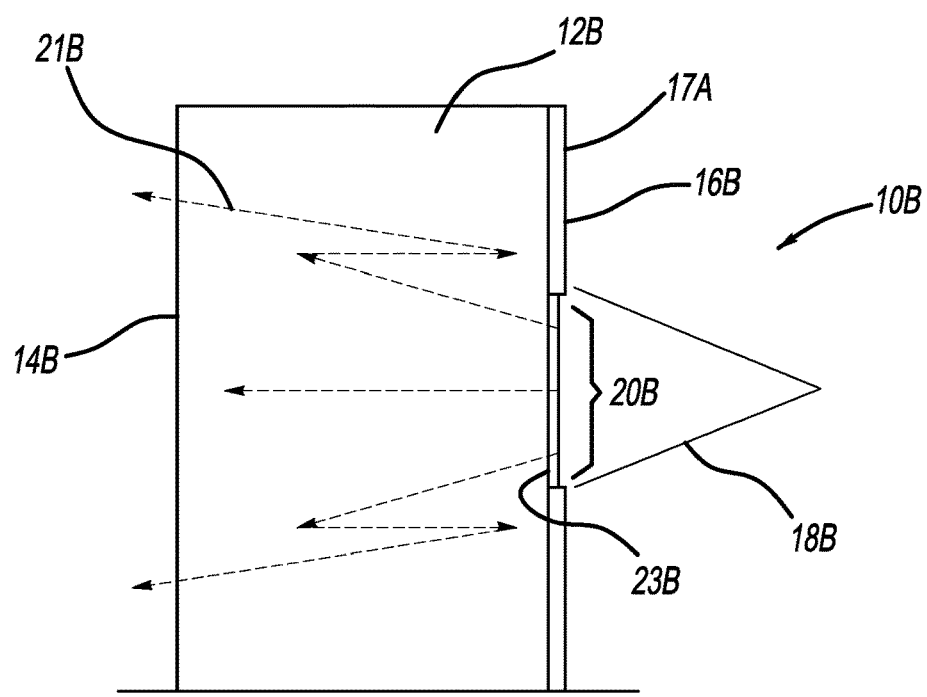

Referring to FIG. 1B, another example of the light panel 10B is shown. Here, like reference numerals have been utilized to refer to like elements. As such, no further description will be given of previously described elements. The light panel 10B includes a light source 18B. The light source 18B may be any source capable of generating light. It should be understood that light should be interpreted broadly, so as to include both the visible spectrum and the invisible spectrum as well. The second layer 16B has had a portion removed so as to define a cavity 20B having an opening 23B. This opening 23B allows light 21B generated by the light source 18B to be provided to the light panel 10B through the cavity 20B. Light 21B provided to the panel 10B may reflect several times through the first panel 12B and will be outputted to a side of the light panel 10B, opposite of a light source 18B. By so doing, light 21B provided by the light source 18B can be provided to a viewer of the panel 10B in a visually pleasing manner. Generally, the light outputted to a viewer will be substantially in the shape of the opening 20B. Since the light 21B reflects within the first layer 12B, the panel 10B will generally be illuminated.

Figure 2A:
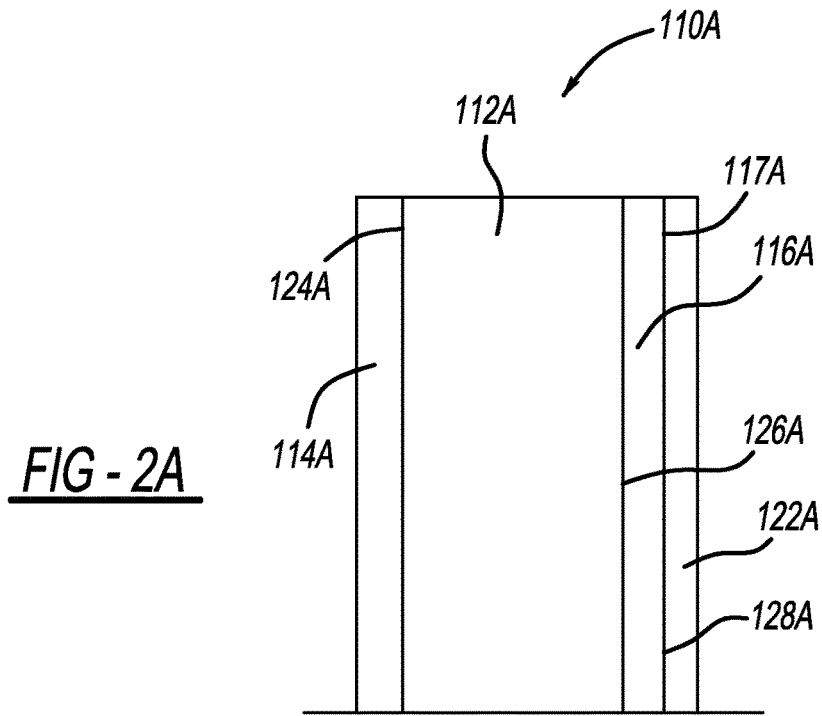
FIGS. 2A, 2B, and 2C illustrate another example of a decorative panel showing a one way transmission of light using a sacrificial layer.

Referring to FIG. 2A, another example of a panel 110A is shown. Like before, like reference numerals have been utilized to refer to like elements and a further description will not be given. Here, the light panel 110A utilizes an optically clear adhesive layer 124A to adhere the third layer 114A to the first layer of 112A. Additionally, a sacrificial layer 122A is adhered to the second layer 116A through the use of an adhesive 128A. The adhesive 128A may be a transparent adhesive, but could also be nontransparent in this configuration.

Figure 2B:
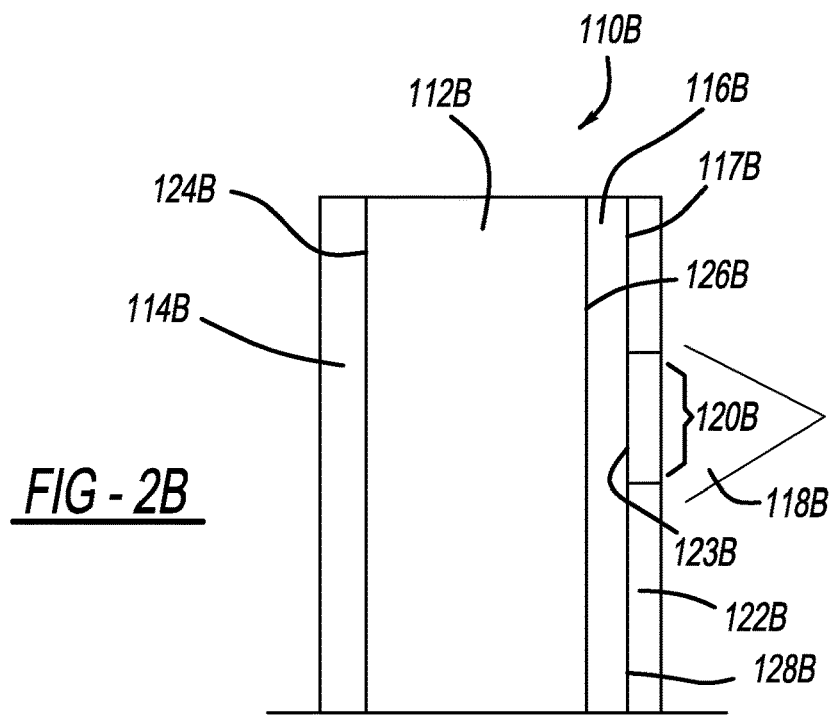

FIG. 2B illustrates a light source 118B and a cavity 120B having an opening 123B. Here, the cavity 120B is defined by removing material from the sacrificial layer 122A as well as the second layer 116B. This essentially creates an opening 127B within the sacrificial layer 122B. Generally, the opening 127B of the sacrificial layer 122B is substantially similar in shape to the opening 123B of the cavity 120B.

Figure 2C:
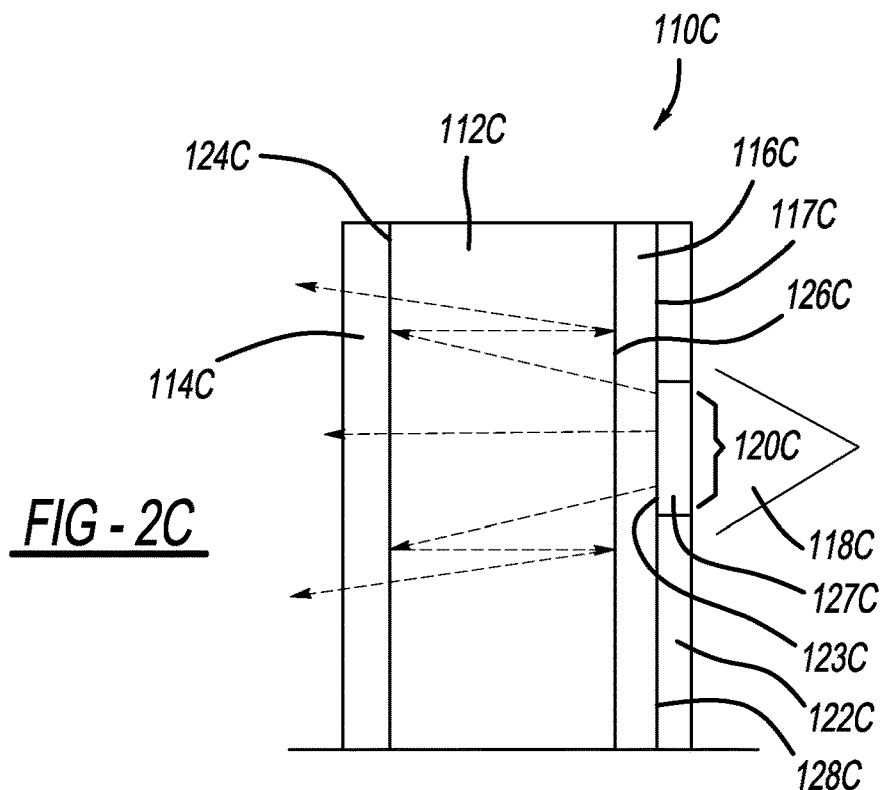

As shown in FIG. 2C, when the light source 118C is providing light to the cavity 120C, light 121C will transmit either directly and/or via reflection within the first layer 112C eventually outputting through the third layer 114C. A person able to view the layer 114C will exhibit a visual pleasing light effect and a design substantially similar to the shape defined by the opening 127C of the sacrificial layer 122C. The panel 110C has the advantage in that it only requires a single light source 118C to create this pleasing image.

Figure 3A:
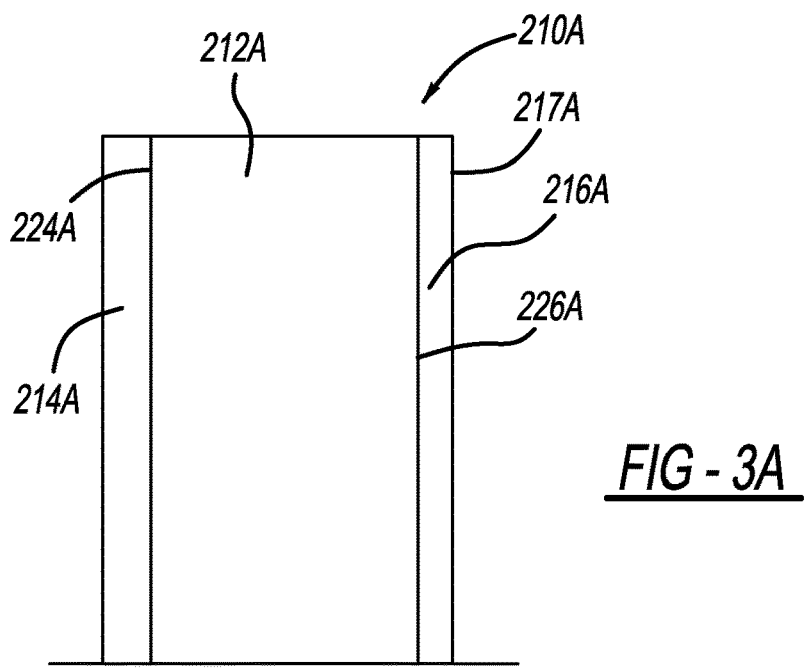
FIGS. 3A, 3B, and 3C illustrate another example of a decorative panel showing a two way transmission of light.
Figure 3B:
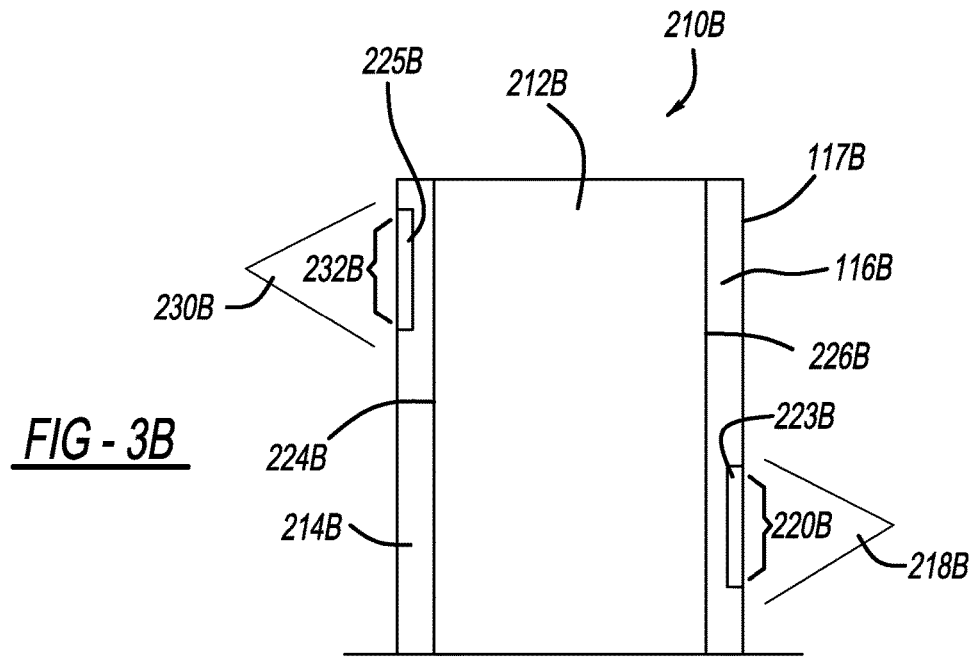
Figure 3C:
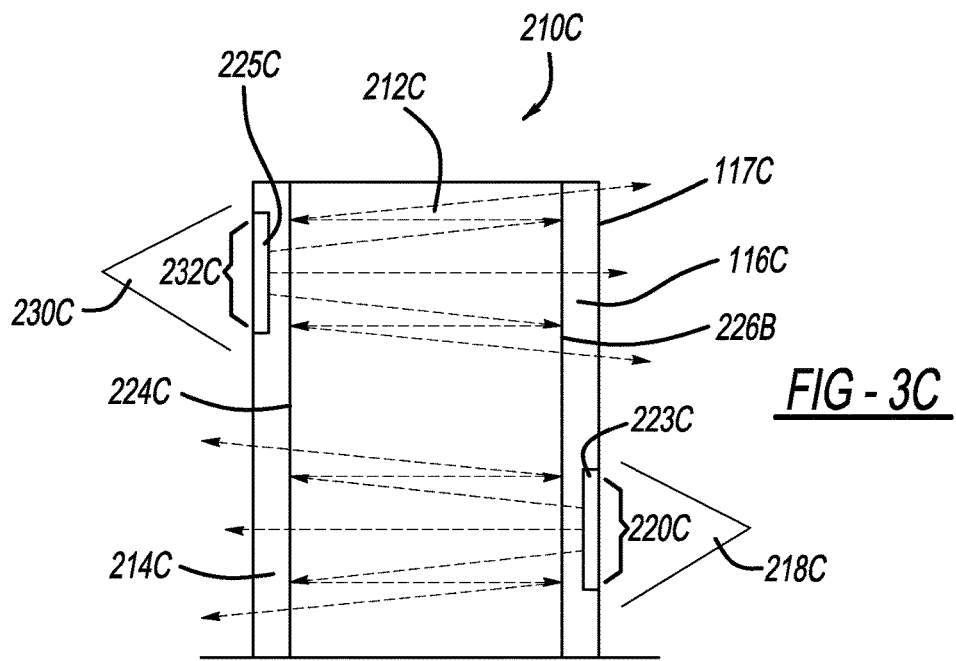

Referring to FIGS. 3A, 3B, and 3C, another example of the light panel 210A, 210B, and 210C is shown. Here, the light panels shown in these Figures are capable of two way transmission of light. Like before, like reference numerals have been utilized to refer to like elements and no further description is needed. Here, the second layer 216A is adhered to the first layer 212A using an adhesive 226A. However, in this case, the adhesive 226A is an optically clear adhesive layer. Similarly, the third layer 214A is adhered to the first layer 212A also using an optically clear adhesive layer 224A.

Referring to FIG. 3B, FIG. 3B shows a light source 218B and 230B located on opposite sides of the light panel 210B. One side of the light panel 210B has a cavity 220B carved by removing portions of the second panel 216B. In like manner, the other side of the light panel 210B also has a cavity 232B carved by removing portions of the third layer 214B.

Referring to FIG. 3C, when light sources 218C and 230C are providing light to the cavities 220C and 232C, respectively, light provided to the panel 216C may transmit through the panel or reflect one or more times through the panel 210C. Light will be outputted on both sides of the panel 210C giving any viewers of the panel 210C, no matter which side they are viewing the panel 210C, a visually pleasing experience.

Figure 4:
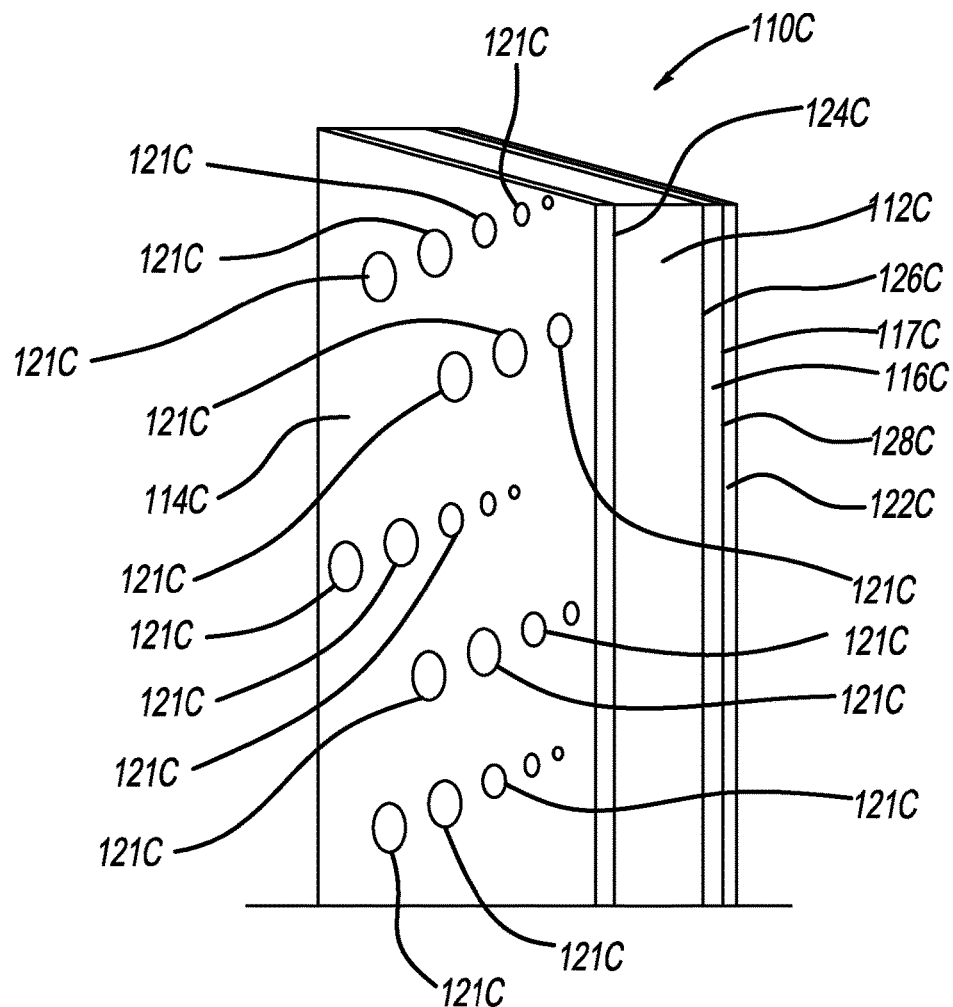
FIG. 4 illustrates a perspective view of the light panel shown in FIG. 2C.

Referring to FIG. 4, this figure shows the light panel 110C, previously shown and described in FIG. 2C. In particular, this figure shows a perspective view of the light panel 110C illustrating the pleasant viewing experience provided to a viewer. Here, light 121C is provided to one side of the panel, opposite the sacrificial layer 122C. Depending on how the sacrificial layer 122C was carved when forming openings, the output of the light 121C will be based thereon. For example, the panel 110C has a plurality of circular shapes emitted to the viewer. These pluralities of circular shapes are also present as cavities formed in the sacrificial layer 122C. So, the sacrificial layer 122C has a similar look with openings mimicking the light 121C viewed by a viewer. Therefore, virtually any shape can be carved into the sacrificial layer 122C and the shape can be provided to the viewer in the form of light 121C. In this instance, a plurality of circular shapes is formed, but any type of shape can be imagined, including pictures, letters, words, corporate logos, advertisements, and the like.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A decorative panel having a first side and a second side, the decorative panel comprising:
   a first layer, the first layer being substantially transparent and is the innermost layer of the decorative panel;
   a second layer having an inner side adjacent to the first layer and an outer side that faces away from the first layer, adhered to the first layer by a first adhesive layer, wherein the second layer is an outermost layer of the first side of the decorative panel, wherein the second layer is partially reflective, the second layer having a depth;
   a third layer having an inner side adjacent to the first layer and an outer side that faces away from the first layer, adhered to the first layer by a second adhesive layer, wherein the third layer is an outermost layer of the second side of the decorative panel, wherein the second layer is partially reflective or transparent, the third layer having a depth;
   first cavity having an opening formed within a portion of the second layer having a depth less than the depth of the second layer, wherein the first cavity is formed on the outer side of the second layer, and the opening of the first cavity having a first design, the first design being configured to allow light to enter the decorative panel to be output through the third layer in a shape substantially similar to the first design; and
   a second cavity having an opening formed within a portion of the third layer having a depth less than the depth of the third layer, wherein the second cavity is formed on the outer side of the third layer, and the opening of the second cavity having a second design, the second design being configured to allow light to enter the decorative panel to be output through the second layer in a shape substantially similar to the second design.

2. The decorative panel of claim 1, wherein the first adhesive layer is an optically clear adhesive layer.

3. The decorative panel of claim 1, wherein the second adhesive layer is an optically clear adhesive layer.

4. The decorative panel of claim 1, wherein the first layer is made from at least one of glass or polymethyl methacrylate.

5. The decorative panel of claim 1, wherein the third layer is made from at least one of glass or polymethyl methacrylate.

6. The decorative panel of claim 1, wherein the second layer is made from at least one of glass or polymethyl methacrylate.

7. The decorative panel of claim 1, wherein the design of the first cavity comprising an opening is a plurality of first cavities comprising corresponding openings.

8. The decorative panel of claim 1, wherein the second design of the second cavity comprising an opening is a plurality of second cavities comprising corresponding openings.

9. The decorative panel of claim 1, wherein the light entering the panel through the first design reflects several times through the panel before being output through the third layer.

10. The decorative panel of claim 1, wherein the light entering the panel through the second design reflects several times through the panel before being output through the second layer.

11. The decorative panel of claim 1, wherein the first design and/or second design comprises at least one of a shape, picture, letter, word, corporate logo, or advertisement.

* * * * *